(12) United States Patent
Parr et al.

(10) Patent No.: US 8,205,017 B2
(45) Date of Patent: Jun. 19, 2012

(54) SYSTEMS AND METHODS FOR ADDRESSING AND SYNCHRONIZING MULTIPLE DEVICES

(75) Inventors: Ian Parr, Basingstoke (GB); Neal Crook, Berkshire (GB)

(73) Assignee: Aptina Imaging Corporation, George Town, Grand Cayman (KY)

( * ) Notice: Subject to any disclaimer, the term of this patent is extended or adjusted under 35 U.S.C. 154(b) by 61 days.

(21) Appl. No.: 12/785,666

(22) Filed: May 24, 2010

(65) Prior Publication Data

US 2011/0119405 A1    May 19, 2011

Related U.S. Application Data

(60) Provisional application No. 61/261,876, filed on Nov. 17, 2009.

(51) Int. Cl.
*G06F 3/00* (2006.01)
(52) U.S. Cl. .......... 710/9; 710/4; 710/10; 710/104; 710/110; 340/9.1; 340/9.16
(58) Field of Classification Search .......... None
See application file for complete search history.

(56) References Cited

U.S. PATENT DOCUMENTS

| | | | | |
|---|---|---|---|---|
| 4,360,870 A * | 11/1982 | McVey | ............... | 710/9 |
| 4,964,038 A * | 10/1990 | Louis et al. | ............... | 710/9 |
| 5,175,822 A * | 12/1992 | Dixon et al. | ............... | 710/9 |
| 5,204,669 A * | 4/1993 | Dorfe et al. | ............... | 340/9.16 |
| 5,317,693 A * | 5/1994 | Cuenod et al. | ............... | 710/9 |
| 5,404,460 A * | 4/1995 | Thomsen et al. | ............... | 710/9 |
| 5,539,390 A * | 7/1996 | Nagano et al. | ............... | 340/9.16 |
| 5,715,475 A * | 2/1998 | Munson et al. | ............... | 710/10 |
| 5,828,899 A * | 10/1998 | Richard et al. | ............... | 710/8 |
| 6,029,216 A * | 2/2000 | Hoglund et al. | ............... | 710/100 |
| 6,163,823 A * | 12/2000 | Henrikson | ............... | 710/100 |
| 6,349,235 B1* | 2/2002 | Gibart et al. | ............... | 700/11 |
| 6,629,172 B1* | 9/2003 | Andersson et al. | ............... | 710/104 |
| 6,738,920 B1* | 5/2004 | Horne | ............... | 713/500 |
| 7,502,840 B1* | 3/2009 | Bakke | ............... | 709/222 |
| 7,752,364 B2* | 7/2010 | Oh et al. | ............... | 710/110 |
| 2003/0074505 A1* | 4/2003 | Andreas et al. | ............... | 710/110 |
| 2005/0097255 A1* | 5/2005 | Barenys et al. | ............... | 710/316 |

(Continued)

OTHER PUBLICATIONS

'8-bit AVR Microcontroller with 16K Bytes In-System Programmable Flash' by Atmel Corporation, copyright 2003.*

(Continued)

*Primary Examiner* — Steven Snyder
(74) *Attorney, Agent, or Firm* — Kramer Levin Naftalis & Frankel LLP

(57) ABSTRACT

This is generally directed to systems and methods for control of two or more devices through a shared control bus. For example, the devices can be coupled to a host system through the control bus. In some embodiments, the devices can be configured by the host system through address select pins of the devices. For example, the host system can sequentially program each device to change its default address to a unique address. In some embodiments, an event can be propagated through each device, thus resulting in each device receiving the event at a different time. In some embodiments, configuration by the host system can include programming each device with a value representing its own position in the chain. In this case, a device can use this value to delay its response to the event, thereby allowing all the devices in the chain to respond to the event simultaneously.

18 Claims, 8 Drawing Sheets

U.S. PATENT DOCUMENTS

| | | | |
|---|---|---|---|
| 2008/0155073 A1* | 6/2008 | Swain | 709/222 |
| 2008/0301344 A1* | 12/2008 | Hsieh | 710/110 |
| 2009/0100198 A1* | 4/2009 | Zatelman et al. | 710/9 |
| 2009/0144471 A1* | 6/2009 | Lin | 710/110 |
| 2009/0182917 A1* | 7/2009 | Kim | 710/106 |
| 2011/0082955 A1* | 4/2011 | Wortham et al. | 710/110 |
| 2012/0072626 A1* | 3/2012 | Scott et al. | 710/104 |

OTHER PUBLICATIONS

'Logic Level' article from Wikipedia.org, archive from Oct. 12, 2009.*

* cited by examiner

SYSTEMS AND METHODS FOR ADDRESSING AND SYNCHRONIZING MULTIPLE DEVICES

CROSS-REFERENCE TO RELATED APPLICATIONS

This application claims the benefit of U.S. Provisional Patent Application No. 61/261,876, filed on Nov. 17, 2009, which is hereby incorporated by reference herein in its entirety.

FIELD OF THE DISCLOSURE

This disclosure relates to systems and methods for control of one or more devices through a two-wire control bus.

BACKGROUND OF THE INVENTION

Oftentimes, one or more electrical devices of an system can be coupled together. For example, in some cases one or more "systems-on-a-chip" ("SOCs) can be attached to and coupled together through a printed circuit board ("PCB"). The PCB may then include a series of I/O pins allowing external systems to communicate with the SOCs on the PCB. For example, a host system can connect to these pins of the PCB to communicate with and control the SOCs.

In order to communicate with the various SOCs, the host can have a way of uniquely addressing each SOC on the printed circuit board. One way of allowing the host to uniquely address each SOC would be to hardwire this system in an appropriate manner. For example, if the PCB has six SOCs on it, then the PCB can include six I/O pins, where each I/O pin can correspond to a different one of the SOCs, and each of the I/O pins can connect to a particular output from the host. However, this hardwiring solution can be inconvenient and cost inefficient to an end user of the system. For example, the number of connections between a host system and the PCB can inefficiently increase with the number of SOCs.

DETAILED DESCRIPTION OF THE DISCLOSURE

Discussed herein are systems and methods for control of two or more devices through a shared control bus. In particular, discussed herein are systems and methods for using a static address selection pin on a series of devices with a two-wire serial control bus to enable device selection and provide an additional synchronous control path.

In some embodiments, two or more electronic devices can be coupled together. For example, the devices can each be mounted on a printed circuit board ("PCB"), where the PCB includes wiring that electrically couples the devices to one another. Alternatively, the devices can be electrically coupled together through any suitable medium or through any suitable manner. In some cases, the device can include a suitable system-on-a-chip ("SOC"). As used herein, the term "SOC" can refer to a microchip, where that microchip can include the transistors, wiring, or other circuitry suitable for performing a particular system function. As a specific illustration, the SOC can include a camera system microchip with an array of one or more light-sensing elements (e.g., CCD light sensors, CMOS light sensors, photodiodes, and the like) and processing circuitry for reading and/or performing signal processing on signals generated by the light-sensing elements. Moreover, various embodiments may be discussed herein with reference to an SOC or to the specific illustration of a camera system. However, this is for illustration and simplicity and is not intending to be limiting. Rather, it should be understood that the various embodiments described herein could be used with any suitable electronic devices that are controlled through a shared control bus.

Figure 1:
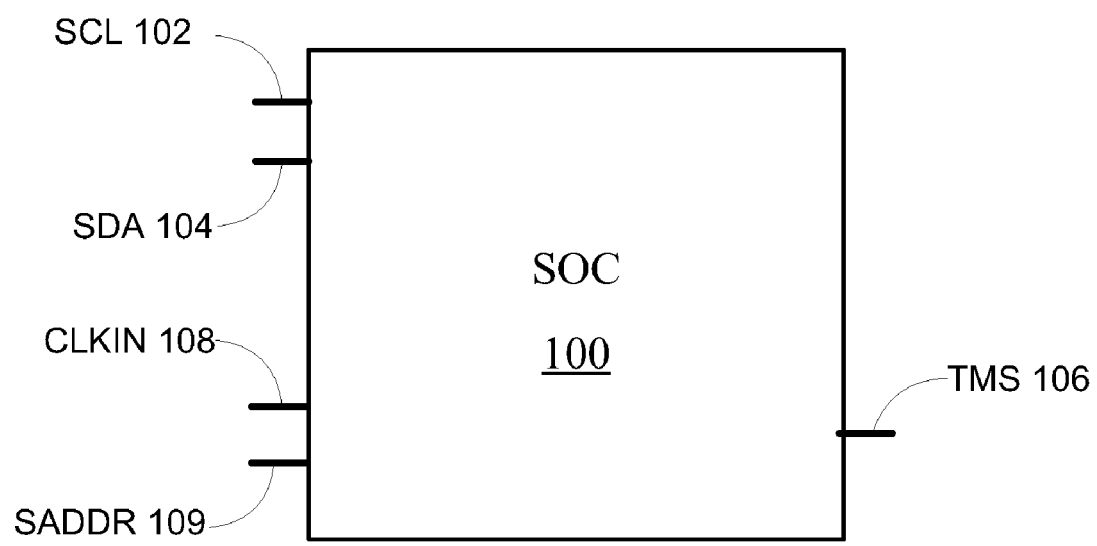
FIG. 1 shows a schematic view of SOC 100 which illustrates an exemplary electronic device in accordance with some embodiments of the invention.

FIG. 1 shows an illustrative system-on-a-chip ("SOC") 100. For example, SOC 100 can illustrate an exemplary device, where multiple copies of this device can be coupled together and controlled through a two-wire control bus. SOC 100 can include various input/output ("I/O") pins such as, for example, Serial Clock ("SCL") 102, Serial Data Line ("SDA") 104, Test Mode Select ("TMS") 106, Clock-in ("CLKIN") 108, and Address Select ("SADDR") 109. In general, any of SCL 102, SDA 104, TMS 106, and SADDR 109 can be operated as either an input pin, an output pin, or an input/output pin depending on the desired use of SOC 100. SCL 102 and SDL 104 can include, for example, bi-directional lines allowing SOC 100 to send and receive information to or otherwise communicate with other systems (e.g., other devices, a host system, etc.). In some embodiments, SCL 102 and SDL 104 can be pulled up to a VDD voltage (e.g., +5 volts, +3.3 volts, or any suitable voltage high level) through, for example, pull-up resistors. CLKIN 108 can receive a clock signal for operating SOC 100.

In order to communicate unambiguously with SOC 100 using the control bus, an address can be associated with SOC 100. For example, SADDR 109 can be used in selecting one of two addresses for the SOC. In some cases, SADDR 109 can allow for a 7-bit address space, thus allowing up to a maximum of 128 unique values to be used as these two addresses which SADDR 109 can assign to SOC 100. When a particular address is assigned to SOC 100 (e.g., through SADDR 109), SOC 100 may then respond to instructions directed to that particular address. For example, a message can be provided to SOC 100 through SDA 104. This message may include a start bit, an address, a command (e.g., read command, write command, or any other suitable command), and then a stop bit. In response to the address of the message matching the particular address of that SOC, the SOC may then perform the command provided in the message.

In some embodiments, two or more devices such as SOC 100 can be coupled together. For example, two or more devices can be electrically coupled together. In some embodiments, the devices can be coupled together in a "chain" fashion, such as a daisy chain. A daisy chain can include, for example, when two or more devices that are connected in a simple serial or parallel chain. For example, in a daisy chain, Device A can be connected to Device B, Device B can be connected to Device C, and so forth. In a daisy chain, generally the devices are not connected in a loop or in a web fashion, and rather the devices are simply connected to the next and preceding devices in the chain. The devices can alternatively be coupled together in any suitable chain configuration, such as in an Inter-Integrated Circuit ("I²C") bus configuration, in a ring configuration, or in any other suitable configuration. Moreover, although specific examples of a chain of devices (e.g., a daisy chain, ring configuration, I²C bus configuration, or other suitable configuration) may be referred to for certain embodiments, this is for illustration and is not intended to be limiting. Rather, it should be understood that any suitable chain of devices could alternatively be used.

Figure 2:
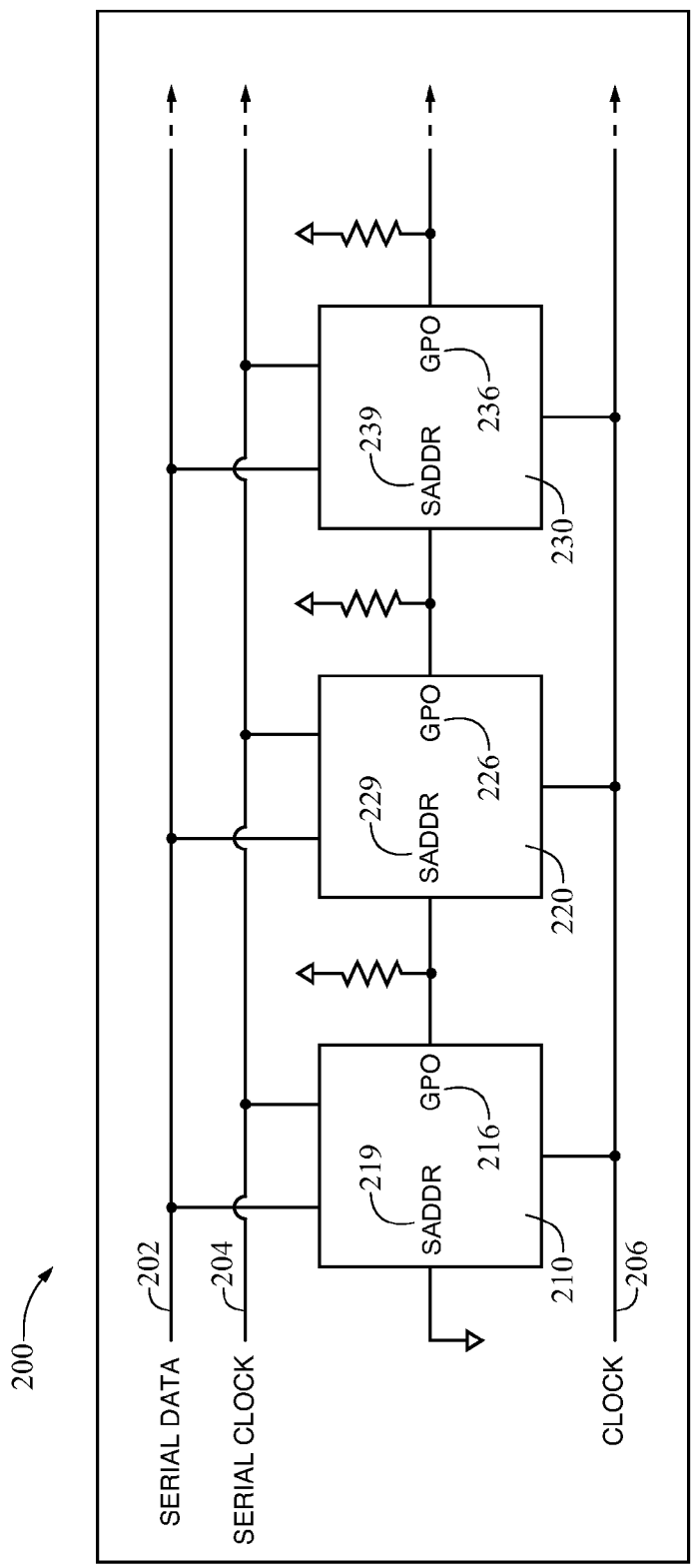
FIG. 2 shows an illustrative schematic view of system 200 in which two or more devices are coupled in a chain in accordance with some embodiments of the invention.

FIG. 2 shows illustrative system 200. For example, system 200 can include an illustrative system in which one or more devices (e.g., devices such as SOC 100 of FIG. 1) are coupled together. For example, FIG. 2 illustrates devices 210, 220 and 230 as being coupled in a daisy-chain through their SADDR inputs and TMS outputs via a shared 2-wire serial interface. However, one skilled in the art could appreciate that devices 210, 220, and 230 of system 200 could alternatively be coupled together in an I²C configuration or in any other suitable configuration. Although three instances of devices and a particular configuration for coupling multiple devices together are illustrated in FIG. 2, one skilled in the art could appreciate that any suitable configuration or number of devices could alternatively be used (e.g., two devices could be in a daisy chain, seven devices could be in a daisy chain, or any other suitable number of electronic devices). Each of devices 210, 220, and 230 can be coupled to a standard two-wire serial control bus with connections such as, for example, serial data line 202 and serial clock line 204. Serial data line 202 and serial clock line 204 can each couple to a suitable pin of devices 210, 220, and 230. For example, serial data line 202 can couple to a SDA pin of each device (e.g., SDA 104 of FIG. 1) and serial clock line 204 can couple to a SCL pin of each device (e.g., SCL 102 of FIG. 1).

The addresses of each of devices 210, 220, and 230 can in some embodiments be selected between two initial, default programmable values by a suitable selector pin. As described above, an SOC may respond to commands provided to the SOC (e.g., received through its SDA pin or other suitable pin) when that command is associated with the particular address assigned to that SOC. For example, address selector ("SADDR") pins 219, 229, and 239 can be used to assign an address to device 210, 220, and 230 respectively. SADDR pins 219, 229, and 239 can, for example, correspond to SADDR 109 of FIG. 1. Similarly, each device 210, 220, and 230 can include a general purpose output ("GPO") pin 216, 226, and 236 respectively. For example, each of GPO 216, 226, and 236 can correspond to a TMS pin (e.g., TMS 106 of FIG. 1) that is being operated as an output pin. System 200 can also include a suitable clock signal, such as clock line 206, which can be provided to a clock-in pin of each of devices 210, 220, and 230. For example, such clock-in pins of devices 210, 220, and 230 could correspond to a pin such as CLKIN 108 of FIG. 1.

As mentioned above, each device of system 200 can include two initial, default response addresses, referred to herein as "ID0" and "ID1." In other words, each of SOC 210, 220, and 230 can initially be assigned either address ID0 or address ID1. The particular address to be assigned to each device can be controlled by a select input pin. For example, SADDR pins 219, 229, and 239 can be driven to either logic low or logic high. When the select pin is driven to logic low, that device may initially have a default address of ID0. Similarly, when the select pin is driven to logic high, the device may initially have a default address of ID1. Accordingly, as illustrated by FIG. 2, SADDR pin 219 can be hardwired to GND and thus SOC 210 may have a default address of ID0. SADDR pins 229 and 239, however, can be coupled to pull-up resistors and also to GPO outputs 216 and 226, respectively, of the prior device in the daisy-chain. Provided that their respective GPO output remains in a high-impedance state or drive a logic 1, SADDR pins 229 and 239 can attain a logic 1 (e.g., and thus SOCs 220 and 230 can have an initial default address of ID1). As will be described in greater detail below, however, after communication has been established with a device of system 200, the address of each device can be reprogrammed by a "host" of system 200 to any suitable value.

As used herein, the terms "host," "host controller," or "host system" can refer to a system or processor that controls a chain of devices, such as system 200. Generally, the host can be a system that is external from the chain of devices. As an illustration, the two or more devices could each be a separate camera system (e.g., a microchip including an array of light-sensing elements) for use in a cellular phone, where the two camera systems are suitably coupled together. System 200 can then be provided to an end user of the system (e.g., a cell phone manufacturer). The end user can then provide a host (e.g., a processor or other computer system) that can control system 200 by coupling to the inputs of the system. For example, in FIG. 2 the inputs of system 200 could be a two-wire control bus including lines such as serial data line 202 and serial clock line 204. Alternatively or additionally, the host could also couple to and control a clock input such as clock line 206. In this manner, the host can suitably configure, control, and otherwise operate system 200.

As mentioned above, as illustrated by FIG. 2, device 210 can have SADDR pin 219 hardwired to GND (e.g., SADDR pin 219 is drive to logic low) and thus device 210 can respond to the address, ID0. Similarly, devices 220 and 230 can have SADDR pins 229 and 239, respectively, driven to logic high, and thus device 220 and 230 can each respond to the address ID1. Moreover, since all of the devices in system 200 can share a common interface with the host, each of devices 210, 220, and 230 may always receive the same inputs from a host through serial data line 202 and serial clock line 204. Thus, in order for the host to issue a command to only a single device of system 200, that device should have a unique address. However, as mentioned above, there are only two default address (e.g., ID0 and ID1), yet there are more than two devices in system 200. This means that currently every device of system 200 may not have a unique address. For example, in the case illustrated by FIG. 2, when the host attempts to write data solely to device 220 by issuing such a command to address ID1, then device 230 will erroneously also follow this command to write the data (e.g., since device 230 also has address ID1).

Accordingly, a host controller of system 200 (not pictured) may perform a configuration procedure to assign a unique address to each device of system 200. In some embodiments, such a configuration procedure could be run upon power-up of system 200. As an exemplary procedure, the system host controller may initially communicate on address ID0 to program device 210 with a new address. Herein, this new address is called "SOC0-ID," but this address ID is for illustration and any other suitable new address ID could be used. For example, the host can send a message on Serial data line 202 that includes address ID0 and a command to reprogram the device's address to SOC0-ID. In some embodiments, the message can include any other suitable information, such as a start bit and/or a stop bit. As device 210 is currently the only device that responds to address ID0 (e.g., devices 220 and 230 both currently respond to address ID1), then only device 210 of system 200 may respond to this message, even though this message is concurrently received by devices 220 and 230. In addition to including a command to reprogram the address of device 210 to SOC0-ID, the message may additionally include commands to enable an additional control mode, define the device's position in the daisy chain, drive GPO pin 216 of device 210 to logic low. As SADDR pin 229 of device 220 now receives a logic low signal (e.g., where this logic low signal is being output from GPO pin 216 of device 210), device 220 may now be re-assigned to address ID0. Device 220 can now thus be programmed in a similar way to device 210 (e.g., with a new unique address, "SOC1-ID," or any other suitable new address ID). By continuing down the chain in a similar manner, the addresses of the remainder of the devices in the chain can be sequentially programmed to a unique address. Since a command provided by the host can be concurrently received by each device of system 200 (e.g., since Serial data line 202 is coupled to each device and thus each device receives all commands issued by the host on Serial data line 202), uniquely addressing each device in this manner can ensure the host has a way of uniquely providing instructions to each device of the system. This procedure for assigning a unique address to each device of the system will be described in greater detail below.

In this manner, a host may assign unique addresses to an arbitrary number of devices, without adding additional control signals between the host and those devices, and while using a fixed number of connections (1 input and one output) on each device. This can beneficially simplify the system and allow for cost reductions. For example, if such a procedure where not used, it may be necessary to hardwire a devoted I/O pin for each device in order for a host system to uniquely address each device. In other words, to communicate with six devices, a host system may need six separate I/O pins, where each of the host's I/O pins is coupled to a separate device's I/O pin. In the system illustrated by FIG. 2, however, a host system can provide commands to a specific device in the system while only requiring two data I/O pins (e.g., to couple to Serial data line 202 and serial clock line 204), regardless of how many devices the host system may control. In this manner, a system such as system 200 can beneficially reduce costs and simplify the overall system.

Thus, as described above, address selector inputs and general purpose output pins can provide additional functionality for a system by being used as an additional, "uni-directional control link" (e.g., where controls and directions for the system can proceed down the chain by passing from an address selector input pin to a general purpose output pin of a device, then to an address selector pin of the next device, and so forth). This uni-directional control may not only provide a way of uniquely address each device of the chain, but can also be capable of providing synchronization information when, for example, a common input clock is used. As an illustration, this uni-directional control link can be used to provide a "multi-sync function," where all of the devices of the system are enabled to perform a particular function in synchronization at the same time. In order for this uni-directional control link to perform multi-sync functions or other functions, the SEL and GPO pins should be properly enabled after an address assignment sequence. For example, this enablement can be achieved by setting ID0 and ID1 to the same value, by low-pass filtering the SEL pin, or by any other suitable mechanism causing the address selection function of the SEL pin to be ignored after the address is programmed.

As an illustration of a multi-sync function, when system 200 represents a system with three camera microchips, each camera may generate images at a particular framerate (e.g., 30 frames per a second, or any other suitable framerate). In this case, it may be desirable to have all three camera microchips align their frames, such that each camera microchip takes a picture of a particular scene at the same time. In other words, it may be desirable to have all three camera microchips begin streaming their data (e.g., data generated by an array of light-sensing elements of each camera microchip) for that scene at the same time. However, since the command to begin streaming data can be passed down the chain (e.g., from device 210 to device 220 to device 230 and so forth), each camera microchip may receive this command to begin streaming data at a different time. Accordingly, a "multi-sync function" can be performed to enable the devices to begin streaming the data at the same instant, even though the devices may or may not receive the command to stream the data at the same time. As used herein, the term "multi-sync" refers to a command or procedure that enables all devices of a system to begin performing a particular function in synchronization.

Figure 3:
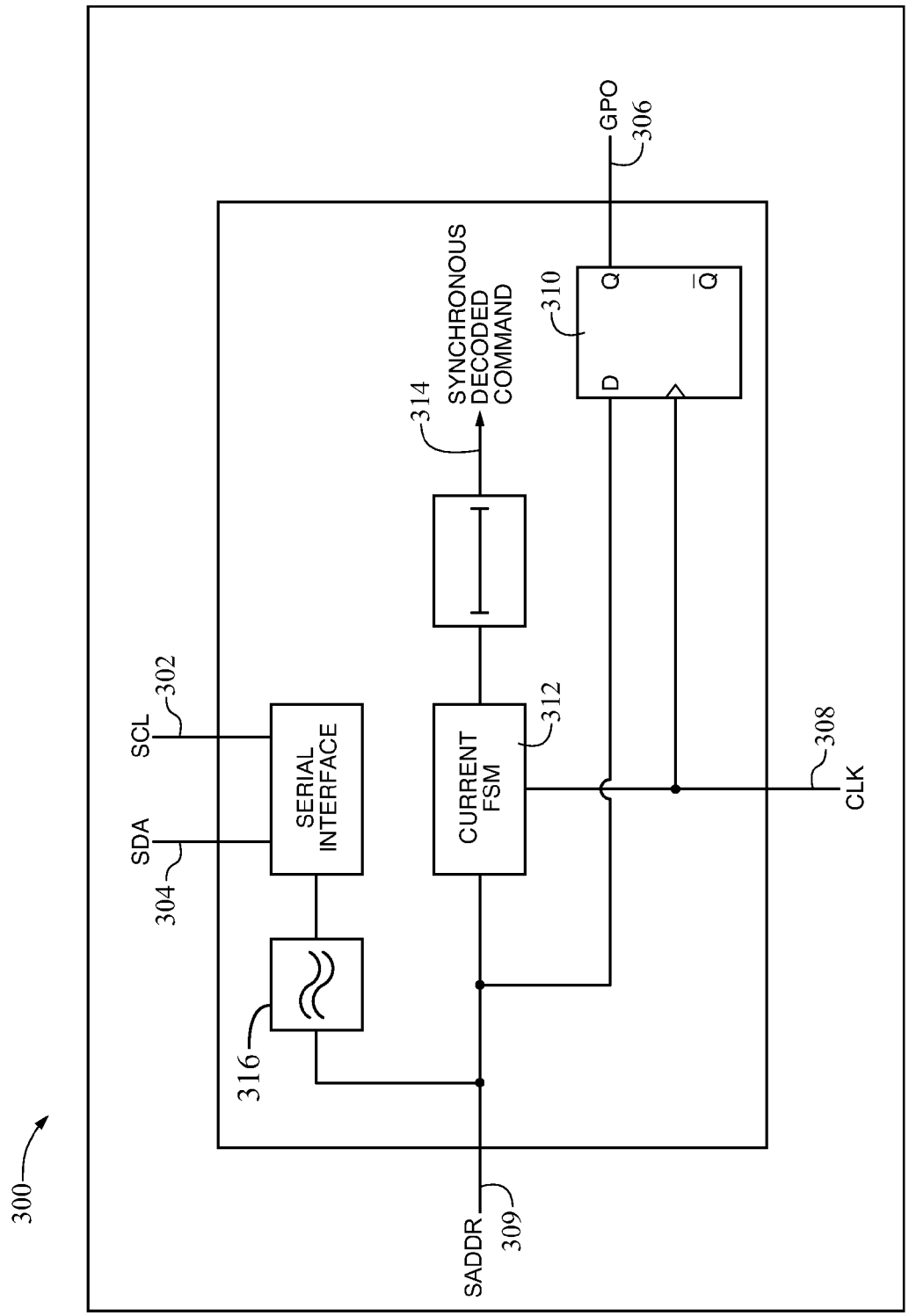
FIG. 3 shows an illustrative schematic view of device 300 in accordance with some embodiments of the invention.

To illustrate how a uni-directional control link can pass commands or other data from an address selector input pin of a device to a GPO pin of that device, FIG. 3 shows a schematic view of device 300. For example, device 300 can correspond to a device such as device 100 of FIG. 1 or to device 210, 220, or 230 of FIG. 2. As shown in FIG. 3, device 300 can include I/O's such as SCL 302, SDA 304, GPO 306, CLK 308, and SADDR 309 that can correspond to, for example, SCL 102, SDA 104, TMS 106, CLKIN 108, and SADDR 109 of FIG. 1 respectively. In some embodiments, the address selection function for system 300 can be essentially static because, for example, SADDR pin 309 can be hardwired to GND or VDD (e.g., as illustrated in FIG. 2, where the hardwiring to VDD may be done via a pull-up). Moreover, SADDR pin 309 can be low-pass filtered (e.g., by low-pass filter 316) by a particular number of clock cycles larger than the command word length. As described above, a low-pass filter such as low-pass filter 316 can enable device 300 to perform additional functions after an address selection sequence.

When device 300 is configured as a master device, an event can be generated by Finite State Machine ("FSM") 312. As used herein, the term "event" can refer any suitable procedure a received command instructs a device to perform such as, for example, streaming data from a camera system of the device, reading data from the device, writing data to the device, and the like. FSM 312 may implement a serial protocol based on Pulse Width Modulation to determine when the event should be performed (e.g., to determine synchronous decoded command 314). The event is thus delayed for local use by the amount of time determined by command 314, and the event is then passed to the next device in the chain through flip-flop 310 and GPO 306.

When device 300 is configured as a slave device, the event can be simply received at SADDR 309 from the previous device in the chain. FSM 312 can receive the event from SADDR 309, and determine a suitable local delay time for the slave device. The event may also proceed from SADDR 309 to flip-flop 310 and, at the next clock cycle (e.g., received by CLK 308), the command can be passed from GPO 306 to the next device in the chain.

Accordingly to enable all devices of the chain to begin performing the event dictated by the received command at the same time, a multi-sync function can be performed by each device. Also, each device should determine a delay time to wait before performing the event (e.g., where the delay can be defined by command 314). In particular, each device of the chain (e.g., devices 210, 220, and 230 of FIG. 2 or any other suitable device) may have been programmed with its particular position in the chain before receiving the command. For example, each device may already know whether it is the first device in the chain, the second device in the chain, the third device in the chain, and so forth. In this case, each device in the chain can calculate a delay period for that device through the equation:

$$D = LN - LP \text{ cycles} \tag{1}$$

where D=time to delay the command, N=number of devices in the chain, L=device latency in passing on command, P=position of device in chain. Each device in the chain can then delay performing the event of the received command by a time period of D, thus resulting in each device synchronously performing the event. In this manner, by each device in a chain delaying its response to a received command by a period of time determined by equation (1), a multi-sync function can be performed that allows each device in the chain to begin performing an event (e.g., performing an action dictated by a received comment) at the same time. Multi-sync functions such as this will be described in greater detail below.

Moreover, address select pin (or other suitable input pin) can provide additional functionality to a system, such as system 200. For example, rather than merely being a hard-wired input that can select between two default address, the address select pin can additionally be used for configuring the system (e.g., assigning a unique address ID to each device, enabling an additional control mode, define the device's position in a register, driving a GPO pin to logic low, and the like). As another example, as will be described in great detail below, the address select pin can also provide additional functionality such as performing a multi-sync function and/or propagating an event down the chain. This additionally functionality can be provided without disrupting the pins normal use as an address selector.

Accordingly, a system such as system 200 can allow multiple devices to generate an output that is synchronized within a small number of clock cycles. This may beneficially allow for a system that requires no change to the existing sensor interface, requires no dedicated pins, has a very small gate-count impact, or any combination of the above. For example, a system such as system 200 can synchronize the output of two or more SOC devices (e.g., through a multi-sync function). As one illustration, two camera systems can be synchronized for use in a stereo or panoramic camera system. As another illustration, three monochromatic sensors can be synchronized and coupled to a light-splitting prism.

In some embodiments, the input clocks of the SOC devices of the chain can be driven from the same oscillator. In some embodiments, the sensors for each device can be re-synced after a mode change. In some embodiments, same-sourced input clocks can be used and the pixel output can be aligned to plus or minus about 4 clock cycles, plus or minus about 1 clock cycle, or plus or minus any other suitable range of clock cycles. In some embodiments, when same-sourced input clocks are utilized, once synchronized the outputs can retain the same output alignment for a particular period of time (e.g., at least 10 minutes, or any other suitable period of time) at maximum frame rate.

The synchronization of the devices through the multi-sync function can be achieved through any suitable means. For example, in some embodiments the synchronization can be achieved through an input pin (e.g., SADDR 109 of FIG. 1). As an illustration, the synchronization can be achieved by including a dedicated input put on each device, where a host controller can drive each of these dedicated input pins. As yet another example, in some embodiments a master/slave approach can be used to synchronize the devices. In this case, at least one SOC can function as the master, and one or more of the remaining SOCs can function as the slaves. The host device can then drive the master device (e.g., through a write command to a suitable register of the master device) and, in response, the master device can cause a multi-sync command to be issued to each of the slave devices.

In some embodiments, when a multi-sync is occurring the output of the devices (e.g., the data being streamed, such as data generated by light-sensing elements of the devices) may not be disrupted. For example, "black fields" can be generated on the output while the outputs of the devices are being synchronized through the multi-sync function. In some embodiments, the output can be stopped when a multi-sync function is occurring. Stopping the output frames in this manner may result in a "longer-than-usual" vertical blanking time. In this case, the multi-sync function can be tied to a mode change (e.g., when a system is in streaming mode, do not start to stream until synchronization is completed).

Figure 4:
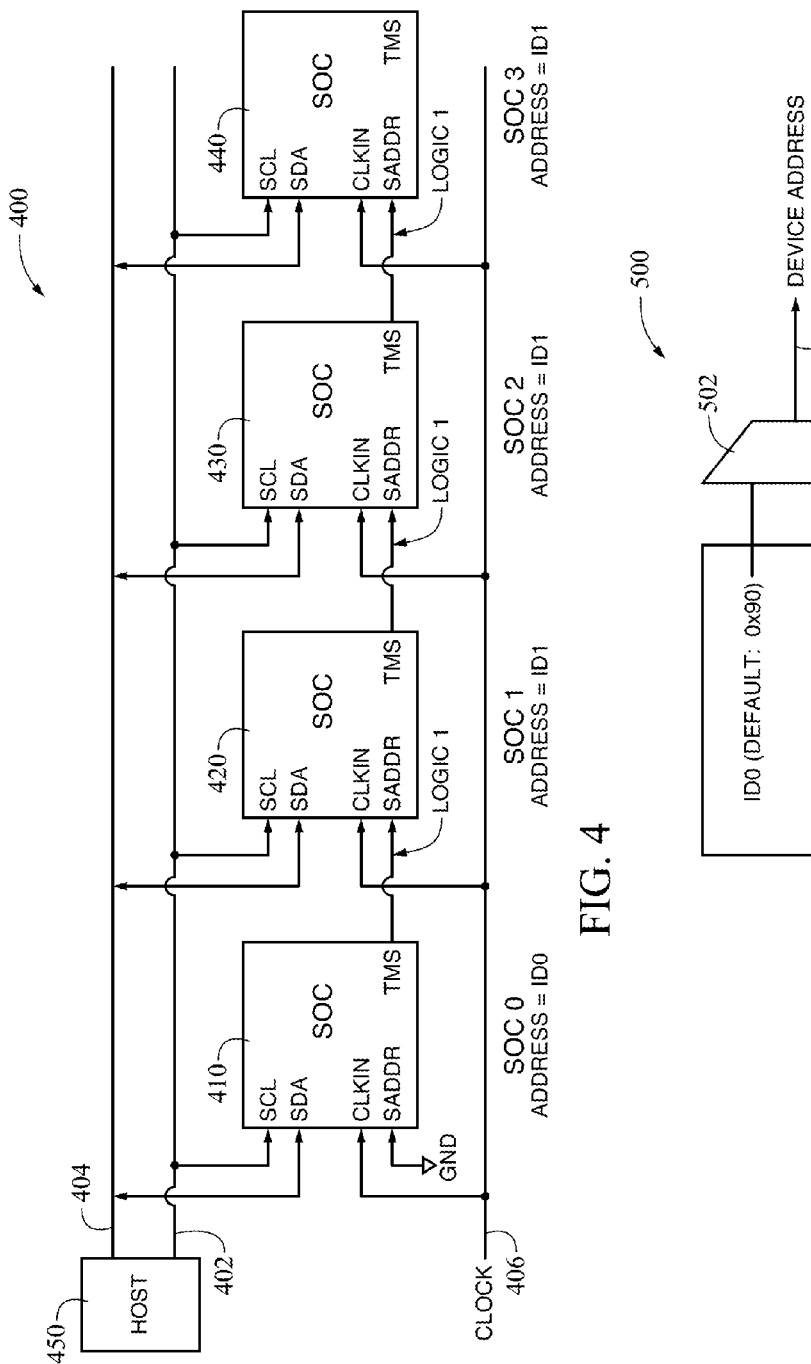
FIG. 4 shows an illustrative schematic view of system 400 of a host controller coupled to two or more devices in a chain directly after power-up of the system in accordance with some embodiments of the invention.
Figure 5:
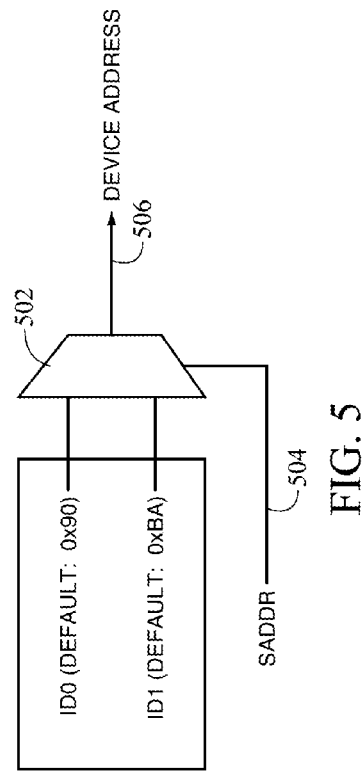
FIG. 5 shows an illustrative schematic view of system 500 that can perform normal SADDR operation in accordance with some embodiments of the invention.
Figure 6:
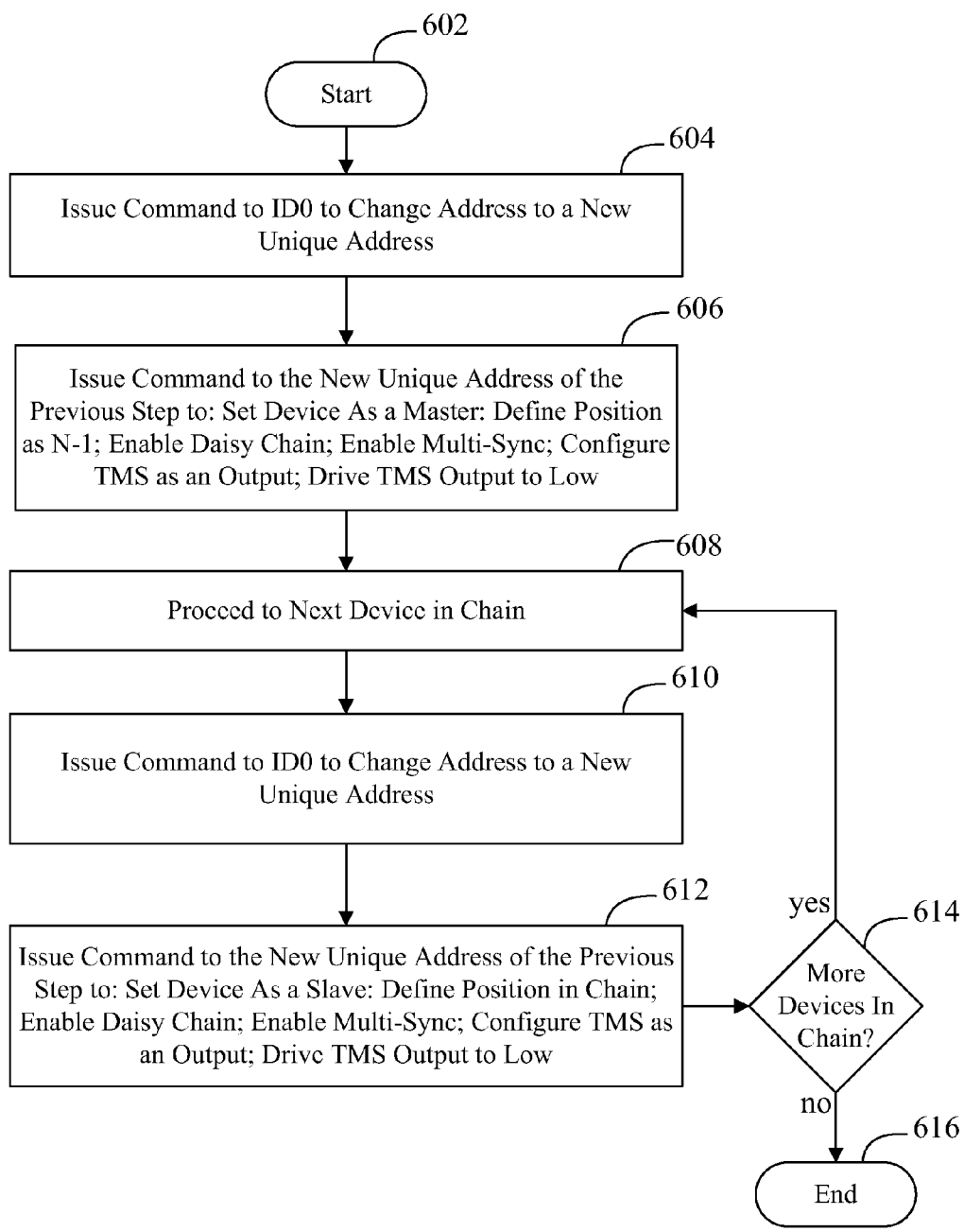
FIG. 6 shows illustrative process 600 for configuring a chain of devices in accordance with some embodiments of the invention.
Figure 7:
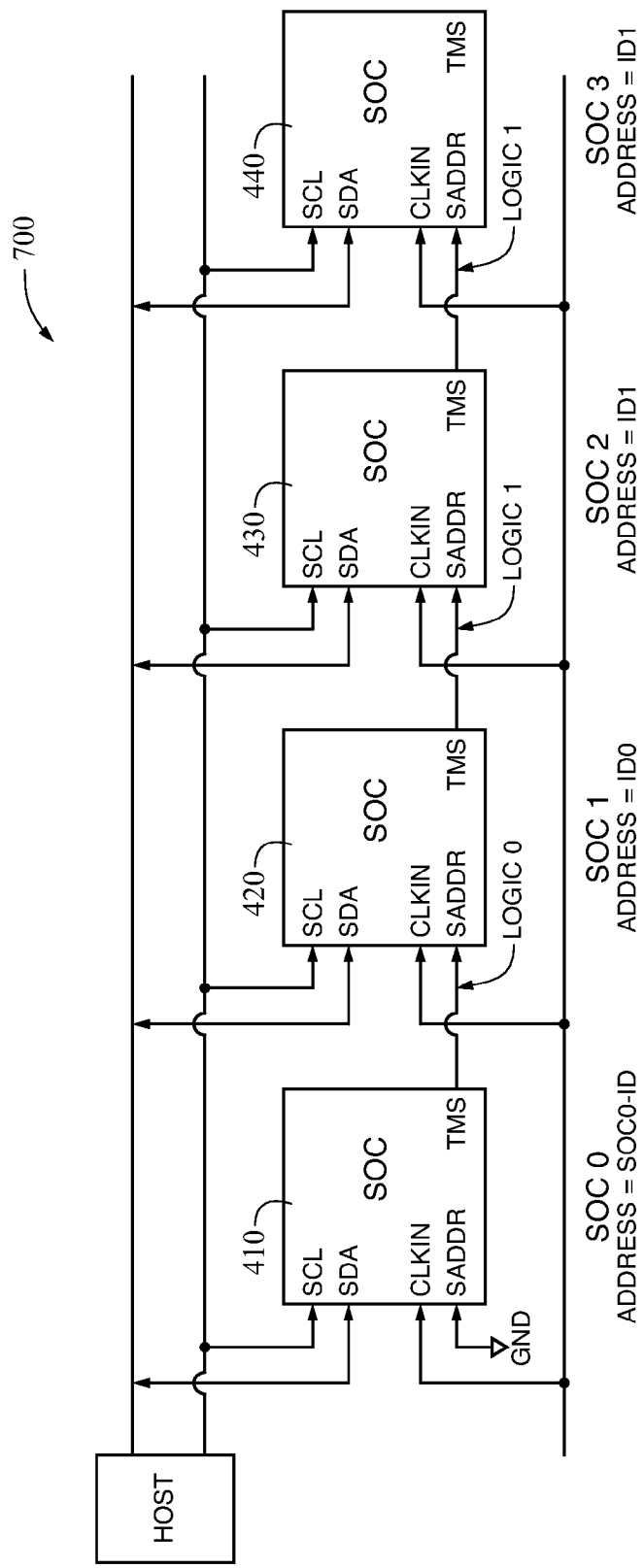
FIG. 7 shows an illustrative schematic view of system 700 of a host controller coupled to two or more devices in a chain, where the master device has been configured in accordance with some embodiments of the invention.

A procedure for assigning a unique address to each device of a chain will now be described in greater detail with respect to FIGS. 4, 5, 6, and 7. FIGS. 4 and 7 show illustrative systems 400 and 700 in which one or more devices can be connected in a daisy chain (e.g., or other suitable chain) and controlled through a two-wire control bus that is coupled to a host system. In particular, systems 400 and 700 can illustrate systems in which the synchronization of the devices can be achieved through a master/slave configuration. FIG. 4 illustrates such a system directly after power-up of system 400. FIG. 7 illustrates such as system after the master device of system 700 has been re-assigned a unique address. Although four instances of devices and a particular configuration for coupling this device together is illustrated in FIGS. 4 and 7, one skilled in the art could appreciate that any suitable configuration or number of instances could alternatively be used. Moreover, although FIGS. 4 and 7 illustrate systems that include only a single master device, such systems could alternatively include two or more master devices.

As illustrated in FIG. 4, system 400 can include SOCs 410, 420, 430, and 440. SOC 410 can operate as a master device and SOCs 420, 430, and 440 can operate as slave devices. Similar to device 100 of FIG. 1, each of SOCs 410, 420, 430, and 440 can include a SCL pin, a SDA pin, a CLKIN pin, a SADDR pin, and a TMS pin. Each SCL pin of SOCs 410, 420, 430, and 440 can be coupled to the Serial Clock line 402, and each SDA pin of SOCs 410, 420, 430, and 440 can be coupled to the Serial Data line 404. The host system 450 can then also be coupled to Serial Clock line 402 and Serial Data line 404, thus allowing host system 450 to control the chain of devices through this two-wire control bus.

As the SOCs of system 400 are to operate in a daisy chain with synchronized outputs, the SADDR pin of each SOC can be configured as an input and the TMS pin of each SOC can be configured as an output. In some embodiments, SOCs 410, 420, 430, and 440 can be clocked from common clock source, clock 406. For example, clock 406 can include a clock signal running at 10 MHz, or at any other suitable speed. The clock signal provided by host system 450 (e.g., and provided on serial clock line 402) can include, for example, a low speed asynchronous clock running at 400 kHz or at any other suitable frequency. As will be described in greater detail below, the slave SOCs (e.g., SOCs 420, 430, and 440) can be controlled by master SOC 410, and master SOC 410 can be controlled by host system 450 (e.g., by software of host system 450).

Generally, in normal operation an SADDR input of a device can be used as a static input (e.g., an input that is hardwired to GND or VDD such that its input value does not change), and thus allows the device to select between one of two default addresses. For example, as illustrated in FIGS. 4 and 7, the two default addresses can be ID0 (e.g., when logic low is provided to the SADDR pin) and ID1 (e.g., when logic high is provided to the SADDR pin). FIG. 5 shows a schematic view of SADDR 500 that can illustrate the normal operation of a SADDR input. For example, SADDR 500 can include multiplexer 502 that outputs one of two default addresses, ID0 and ID1. Based on the value of SADDR input 504 to multiplexer 502, multiplexer 502 will output a particular value for device address 506 (e.g., where device address 506 can determine the address that is assigned to the device including SADDR 500). As an illustration, when SADDR input 504 is a logic low, multiplexer 502 can output a value of ID0. As another illustration, when SADDR input 504 is logic high, multiplexer 504 can output a value of ID1. By utilizing a system implementing a configuration function and/or a multi-sync function however, an SADDR input can have additional functionality over what is illustrated by FIG. 5. Moreover, as will be described in detail below, this additional functionality does not interfere with the SADDR's normal use as an address selector for its device.

As described above, in some embodiments the output pin of devices in a system such as systems 400 and 700 can be performed by the TMS pin (e.g., TMS pin 106 of FIG. 1). In general cases, a TMS pin can operate as an input that is used as part of a JTAG interface in procedures such as manufacturing testing, debugging of code running on an internal processor, and the like. However, in order to implement a system such as systems 400 and 700 to uniquely address devices of the system or to perform a multi-sync function, the TMS pins should be configured to operate as an output pin or as I/O pin. In some embodiments, when an SOC is enabled to perform such a multi-sync function, it may not possible to use the JTAG port. Moreover, as illustrated by FIG. 4, upon power-up of the system all TMS pins can output a logic high signal (e.g., "logic 1"). This can result in all slave devices in system 400 receiving an input on their SADDR pin of logic high, and thus causes all slave devices (e.g., SOCs 420, 430, and 440) to be assigned an address of ID1 upon power-up of the system. In some embodiments, the TMS of each device of system 400 (e.g., SOCs 410, 420, 430, and 440) can include an internal pull-up that drives the TMS output to logic high upon power-up. Alternatively or additionally, a pull-up resistor can be used to pull the TMS outputs (e.g., and the SADDR inputs of the slave devices) to logic high when, for example, the internal pull-up of the TMS is not sufficient to drive its output to logic high.

In some embodiments, a control register (e.g., herein referred to as "chain_control") can be included for each SOC to aid in the unique multi-sync function. For example, the chain_control register can store the particular values used to configure system 400 when assigning the unique addresses to each SOC of system 400. In this case, the chain_control register may be accessible (e.g., across the two-wire control bus) to host system 450. For example, an illustrative chain_control register assignment is shown in Table 1. The bit values, descriptions, and other values given in Table 1 are for the purpose of illustration and not of limitation, and it should be understand that any other suitable chain_control register assignments could alternatively be used.

TABLE 1 chain_control Register
chain control

| Bit | Name | Default | |
|---|---|---|---|
| 15 | chain_enable | 0 | 0: multi-camera daisy chain communication function is disabled. 1: multi-camera daisy-chain communication function is enabled. The result of toggling this bit while the sensor is in streaming mode can be UNDEFINED. |
| 14 | sync_enable | 0 | 0: mult-sync function is disabled. 1: multi-sync function is enabled. The result of toggling this bit while the sensor is in streaming mode can be UNDEFINED. |
| 13 | master | 0 | 0: this node is not the master. 1: this node is the master. The result of toggling this bit while the sensor is in streaming mode can be UNDEFINED |
| 12 | RESERVED | | |
| 11:08 | position | 0 | A unique value assigned to each device in the daisy-chain. The device furthest from the master can be assigned a position value of 0. The next device can be assigned a position value of 1. For N devices in a daisy-chain, the master can be assigned a position value of N − 1. The result of changing this value while the sensor is in streaming mode can be UNDEFINED |
| 7:00 | RESERVED | | |

As mentioned above, in some embodiments before the multi-sync function can be used, each SOC in the chain can be configured to have a unique address and otherwise configure the devices for use in the chain. In particular, this configuration can involve assigning a unique address to each SOC, configuring the chain_control register of each SOC, or any other suitable configurations. This configuration process can be performed by the host (e.g., host 450).

After power-up of the system (e.g., before configuration has begun) the master SOC can have its SADDR input wired to logical 0 and all other SOCs in the daisy-chain can have their SADDR inputs driven to logical 1. For example, this configuration is illustrated by FIG. 4 where the SADDR input of master SOC 410 is hardwired to GND and the SADDR inputs of slave SOCs 420, 430, and 440 are receiving a logic 1 (e.g., due to the TMS outputs of each SOC being driven to logic 1 by an internal pull-up and/or a pull-up resistor and the like). In this case, master SOC 410 can initially respond to the address ID0 (e.g., since the value of SADDR=0) and the other SOCs in the daisy-chain (e.g., SOCs 420, 430, and 440) can respond to the address ID1. In other words, since all slave devices are all currently assigned the address ID1, when a command is issued by host 450 to the address, ID1, all of SOCs 420, 430, and 440 can respond to this command. To configure each SOC of system 400 to have a unique address, host 450 can configure each SOC in sequence by starting with master SOC 410 and ending with the farthest slave in the daisy-chain (e.g., SOC 440). For example, FIG. 6 shows illustrative process 600 for configuring each SOC to have a unique address.

Process 600 can begin at step 602. For example, step 602 can occur upon power-up of the system. At step 604, a command can be issued to the address ID0 to change this device's address to a new, unique address. For example, a message can be issued from a host controller such as host system 450 of FIG. 4. The message may include a start bit, the ID0 address, the command to change the device's address, and a stop bit, or any other suitable data. As illustrated by FIG. 4, upon power-up of the system, SOC 410 can be the only device with address ID0. Accordingly, only SOC 410 (e.g., and none of the other devices in system 400) may respond to this command to change its address to a new, unique address. As an illustration, the command can include instructions to write to the address_register to change the addresses associated with ID0 and ID1 on SOC 410 to a new, unique value. As a specific illustration, the new unique address value can be called "SOC0-ID." However, this is for the purpose of illustration and it should be understand that the master device could be assigned any other suitable, new address ID other than SOC0-ID. Accordingly, in response to this command, the address of SOC 410 can be changed from ID0 to SOC0-ID.

At step 606, a command can be issued to the new, unique address of step 604 (e.g., "SOC0-ID"). Once again, as an illustration this command may be issued from the host controller and in some embodiments can include a start bit, the SOC0-ID address, the command, and then a stop bit. As the command is addressed to SOC0-ID, only SOC 410 will respond to this command. The command may instruct SOC 410 to set itself as the master device, to enable the daisy chain, and allow multi-sync functions. For example, to accomplish this, the command can include instructions to write to the chain_control register (e.g., Table 1) to set chain_enable=1, sync_enable=1, and master=1. The command may also include instructions to define the device's position in the chain. For example, the command can include instructions to write to the chain_control register to set Position=N−1, where "N" is the number of devices in the chain (e.g., where system 400 would have N=4).

Moreover, the command of step 606 can include instructions to configure the TMS pin of SOC 410 as an output. For example, the command can instruct SOC 410 to write to register pad_control to configure TMS as an output. In response to being configured as an output, the output of SOC 410 at the TMS pin can be driven to logic low. As the output of the TMS pin is also the input of the SADDR pin of SOC 420, this may additionally cause the address of SOC 420 to be changed to ID0. For example, this situation can be illustrated by system 700 of FIG. 7. System 700 includes SOCs 410, 420, 430, and 440 in generally the same configuration as illustrated by system 400 of FIG. 4. However, dissimilar to system 400, SOC 410 is assigned the new, unique address of SOC0-ID. Also, the output of the TMS pin of SOC 410 has been driven to logic low, and thus a value of "logic 0" appears on the connection between the TMS pin of SOC 410 and the SADDR pin of SOC 420. Accordingly, as the SADDR pin of SOC 420 is now receiving a logic low, the address of SOC 420 is now ID0.

At step 608, process 600 can proceed to the next device in the chain. For example, in the system illustrated by system 400, the process can proceed to SOC 420. At step 610, the process can once again issue a command to the address ID0 to change that device's address to a new, unique address. Dissimilar to step 604, however, in this situation the only SOC with address ID0 is now SOC 420, and accordingly only SOC 420 may respond to this command. As an illustration, the command can include instructions to write to the device's address_register to change the addresses associated with ID0 and ID1 on SOC 420 to a new, unique value. For example, as a specific illustration, the address ID of SOC 420 can be changed to "SOC1-ID."

At step 612, a command can be sent to the new, unique address of step 610 (e.g., "SOC1-ID"). As SOC 420 can be the only device with this unique address, only SOC 420 may respond to this command. The command can instruct SOC 420 to be configured in a manner that is generally similar to the configurations performed at step 606. For example, the command may instruct SOC 420 to enable the daisy chain, to allow multi-sync functions, and to drive its TMS output to logic low. As illustration, to accomplish this, the command can include instructions to write to the $chain_{13}$ control register (e.g., Table 1) to set $chain_{13}$ enable =1 and $sync_{13}$ enable =1 and can include instructions to write to register $pad_{13}$ control to configure TMS as an output. The result of configuring the TMS pin of SOC 420 to logic low can be to provide a logic low signal to the SADDR input of SOC 430, thus assigning SOC 430 a new address of IDO. Dissimilar to the configurations performed at step 606, however, at step 610 SOC 420 can be configured as a slave device and the position of SOC 420 in the chain can be defined as N−2. As an illustration, to accomplish this, the command can additionally include instructions to write to the $chain_{13}$ control register to set master =0.

At step 614, process 600 can determine whether there are more devices in the chain. In response to their being more devices, process 600 can return to step 608 to proceed to the next device in the chain (e.g., to SOC 430). Process 600 can then continue to repeat steps 608, 610, 612, and 614 until all devices in the chain have been configured. This can result in the remaining devices being set as a slave device, enabling the chain function, enabling the multi-sync function, configuring their TMS pin as an output, and suitably defining their position in the chain. For example, in the system illustrated by system 400, SOC 430 can be assigned a position of N−3 and SOC 440 can be assigned a position of N−4. In response to all of the devices in the chain being configured, process 600 can end at step 616.

As described with reference to FIG. 6, each device of the daisy chain can configure the device with its position in the chain. Although FIG. 6 defines each device's position in descending order (e.g., SOC 410 is assigned the position of N−1=3, SOC 420 is assigned the position of N−2=2, SOC 430 is assigned the position of N−3=1, and so forth), alternatively each device's position could be defined in ascending order. In some embodiments, the host system may be pre-configured to know many SOCs are present prior to configuring the devices through a process such as process 600. For example, the host controller can be pre-programmed with the number of devices in the chain prior to executing a configuration procedure. Alternatively, in some embodiments the host system can determine how many devices are present during the configuration procedure. For example, to determine the number of devices in the chain, the host can split the configuration process into two sequences. As an illustration, these two sequences can include:

Work from master (e.g., SOC 410) to farthest slave (e.g., SOC 440) to sequentially configure the address of each device (e.g., by writing to the address_register of each device) and configure the TMS pin of each device as an output (e.g., by writing to the pad_control register of each device) until no device responds to the ID0 address. By counting how many devices were configured in this process, the host can determine the number of devices in the system, N.

Once the value of N is determined, the host can once again work from the master (e.g., SOC 410) to farthest slave (e.g., SOC 440) to sequentially configure the chain_control registers of each device. For example, each device can be instructed to write to the chain_control register to set chain_enable=1, sync_enable=1, and position=N−M, where M can be the order in which each device is process (e.g., M=1 for SOC 410, M=2 for SOC 420, M=3 for SOC 430, and so forth). As another example, when the position of the device is defined in ascending order, each device may simply be instructed to set position=M to define that device's position in the chain. The master device (e.g., SOC 410) can be instructed to write to the chain_control register to set master=1, and the slave devices (e.g., SOCs 420, 430, and 440) can be instructed to write to the chain_control register to set master=0.

Table 2 shows illustrative register writes for a configuration process, such as the one illustrated by process 600 of FIG. 6. Table 2 can illustrate, for example, a scenario where device addresses of 0xA0, 0xA2, 0xA4 and 0xA6 are chosen for the devices of the chain. The bit values, descriptions, and other values given in Table 2 are for the purpose of illustration and not of limitation, and it should be understand that any other suitable register writes could alternatively be used.

TABLE 2

Illustrative Register Writes for Chain Configuration

| Sequence | Register | SOC0 | SOC1 | SOC2 | SOC3 |
| --- | --- | --- | --- | --- | --- |
| Reset | address_register | 0xBA90 | 0xBA90 | 0xBA90 | 0xBA90 |
|  | pad_control | 0x0FD0 | 0x0FD0 | 0x0FD0 | 0x0FD0 |
|  | chain_control | 0x3020 | 0x3020 | 0x3020 | 0x3020 |
| SOC0 Configured | address_register | 0xA0A0 | 0xBA90 | 0xBA90 | 0xBA90 |
|  | pad_control | 0x0FD2 | 0x0FD0 | 0x0FD0 | 0x0FD0 |
|  | chain_control | 0xE300 | 0x3020 | 0x3020 | 0x3020 |
| SOC1 Configured | address_register | 0xA0A0 | 0xA2A2 | 0xBA90 | 0xBA90 |
|  | pad_control | 0x0FD2 | 0x0FD2 | 0x0FD0 | 0x0FD0 |
|  | chain_control | 0xE300 | 0xC200 | 0x3020 | 0x3020 |
| SOC2 Configured | address_register | 0xA0A0 | 0xA2A2 | 0xA4A4 | 0xBA90 |
|  | pad_control | 0x0FD2 | 0x0FD2 | 0x0FD2 | 0x0FD0 |
|  | chain_control | 0xE300 | 0xC200 | 0xC100 | 0x3020 |
| SOC3 Configured | address_register | 0xA0A0 | 0xA2A2 | 0xA4A4 | 0xA6A6 |
|  | pad_control | 0x0FD2 | 0x0FD2 | 0x0FD2 | 0x0FD2 |
|  | chain_control | 0xE300 | 0xC200 | 0xC100 | 0xC000 |

As mentioned above, in addition to a configuration process such as process 600, a host system can control a multi-sync function. In some embodiments, the system should be configured through a process such as process 600 prior to performing a multi-sync function. Generally, the multi-sync function can enable all the devices of the chain to begin performing a particular "event" at the same time. An event can include, for example, writing data to the devices, reading data from the devices, streaming image data from a camera system device, and any other suitable event. As used herein, the term "streaming image data" can refer to the image generation process performed by a camera system device. For example, such a camera system can include an imaging microchip with an array of light sensing elements (e.g., photodiodes, CCD light sensors, CMOS light sensors, and the like) where these light sensing elements can accumulate charge when exposed to light. The amount of time the light sensing elements are allowed to accumulate charge can be called the "integration time" of that device. Accordingly, when such a device begins "streaming image data", this can refer to when the light-sensing elements of that device start accumulating charge for a particular image. Alternatively, "beginning to stream image data" can refer to any other suitable point in the image generation process of the camera system device. In some embodiments, when a device begins streaming image data, that device can assert a suitable output signal such as a "FRAME_VALID."

Accordingly, when a multi-sync function is performed to enable all devices of a system to begin streaming image data at the same time, this can result in all of the devices aligning their framerates (e.g., all devices take a picture at the same time) and the like. Moreover, this disclosure may describe various embodiments with regards to the particular event of streaming image data. However, this is for illustration and not for limitation, and it should be understand that the multi-sync function could enable the chain of devices to simultaneously perform any suitable event.

In some embodiments, devices of a chain can have at least two fundamental operating states. For example, camera systems may have a "standby mode" and a "streaming mode." The standby mode can correspond to when the camera system is not generating an image. In some embodiments, various device configurations can be performed while the device is in standby mode. As an example, attributes of the camera system such as image size, output format, PLL settings, address identification, any of the attributes discussed with respect to FIG. 6 (e.g., chain enabling, multi-sync function enabling, defining device position, etc.), or any other suitable attributes can be configured while the camera system is in standby mode. The streaming mode, on the other hand, can correspond to when the camera system is operable to generate an image. In some embodiments, to set a device into a streaming mode, a "streaming bit" of that device can be set. As an illustration, when its streaming bit is set equal to 1, that device can be configured into streaming mode. As another illustration, when the device's streaming bit is set equal to 0, that device can be configured into standby mode.

As mentioned above, it may be desirable to have all devices of a chain perform an event such as streaming image data at the same time (e.g., through the multi-sync function). To set a device into streaming mode, a host system can issue a command to that device to set its streaming bit (e.g., set streaming bit=1). However, as each device can have a unique address (e.g., such as a unique address assigned by a process such as process 600), the host may not be able to simultaneously set each device into streaming mode at the same time. Rather, the host may have to issue several, separate commands to set the streaming bit, where each separate command can be addressed to one of the unique addresses. Accordingly, the multi-sync function can be performed to enable all of the devices to being streaming their image data (e.g., or begin performing any other suitable event) at the same time.

For example, by enabling the multi-sync function, when a device is set into streaming mode it may not begin streaming image data immediately. Rather, in some embodiments, once all the devices have been put into streaming mode, the master device can issue an "event" at its TMS pin. The event can then be received by the next slave device in the chain on this next device's SADDR pin. The event can then be propagated down the chain from a TMS pin of one device to the SADDR pin of the next device, and so forth. Once the event is received by a device, that device can calculate an "Event Delay value" based on its position in the chain. Each device can then wait a period of time corresponding to the Event Delay value before beginning to perform the received event (e.g., streaming image data). The value of the Event Delay can be determined by each device such that each device begins performing the event at the same time. For example, the Event Delay value for a particular device can be calculated based on the amount of time require for the Event to propagate from the particular device to the end of the chain and the amount of time required for the last device in the chain to respond to the Event. In this case, a device near the end of the chain (e.g., that can receive the Event at a relatively later time) can have a smaller Event Delay value than a device near the beginning off the chain (e.g., that can receive the event at a relatively earlier time).

In order to configure the SOCs to perform the multi-sync function and to begin streaming the data concurrently, the host system can use any suitable mechanism or procedure. In some embodiments, the host can configure the SOCs to perform the multi-sync function in any suitable order provided that the host configures the master device last (e.g., where the devices can be configured by setting the streaming bit of each device). In this case, the master device can be the last device in the chain to have its streaming bit set equal to 1 (e.g., or to any other suitable value). In some embodiments, when the devices are taken out of streaming mode it can be desirable to have the master device removed from streaming mode before the slave devices.

In some embodiments, to stream the image data concurrently, all SOCs of the chain should have the same image configuration (e.g., image size, output format, PLL settings, integration time, or any other suitable image configuration settings). For example, such configuration settings can be configured into a device while that device is in Standby Mode. In the case of the integration time configuration setting, the integration time can in some embodiments be imposed by the host but may be implemented by having each SOC force its integration time to a particular value before having the SOCs concurrently enter streaming mode.

Figure 8:
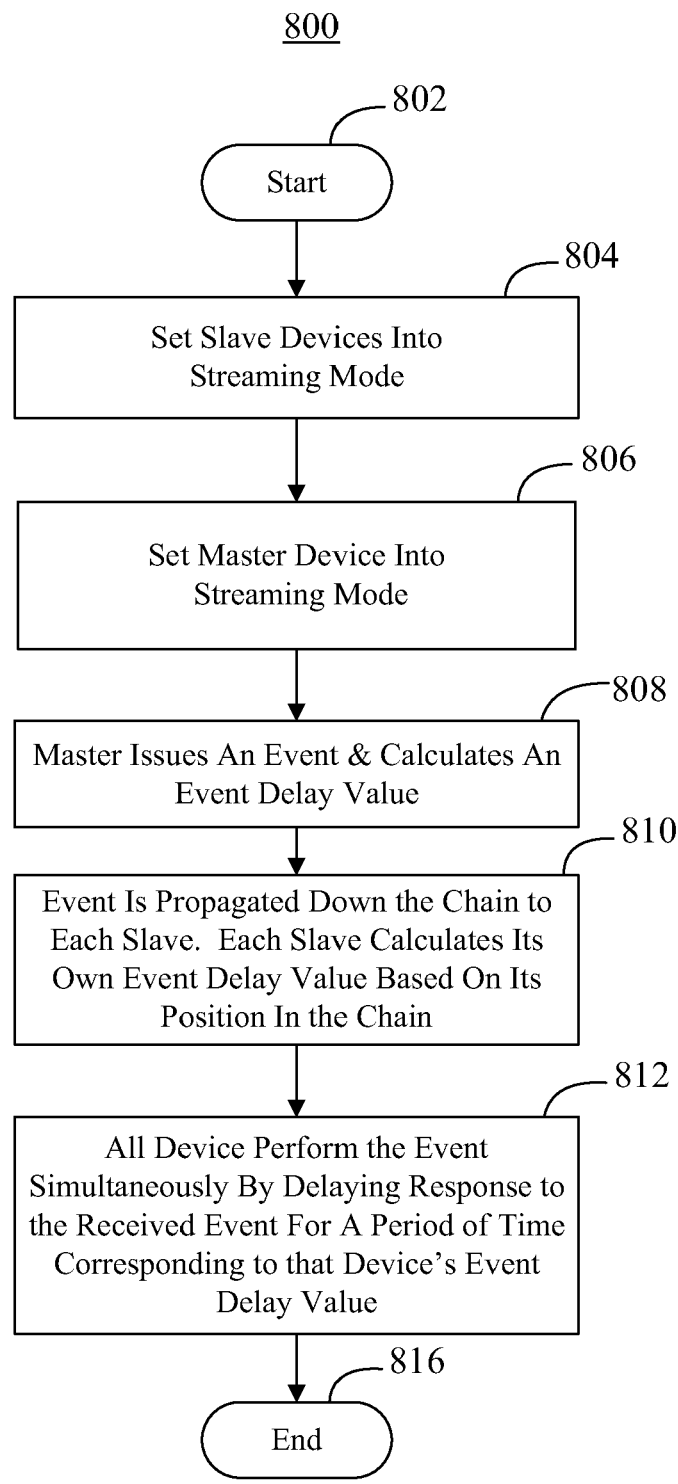
FIG. 8 shows illustrative process 800 for performing a multi-sync function in accordance with some embodiments of the invention.

FIG. 8 shows illustrative process 800 for performing a multi-sync function. Process 800 can begin at step 802. For example, at step 802 the devices of the chain can currently be in standby mode and/or may have their configuration settings being configured (e.g., settings such as image size, output format, PLL settings, integration time, chain position, unique addresses, or any other suitable image configuration settings). At step 804, the slave devices can be set into streaming mode. For example, to set the slave devices into streaming mode a host system can properly configure a streaming bit of each slave device. As an illustration, the host could transmit commands on a Serial Data line (e.g., Serial Data Line 404 of FIG. 4) that are addressed to each of the slave devices, where the command instructs the streaming bit to be set equal to 1. The slave devices can be set into streaming mode in any suitable order. For example, the slave device can be set into streaming mode in sequential order, random order, or any other suitable order.

At step 806, the master device can be set into streaming mode (e.g., by having the host issue a command to set the master device's streaming bit equal to 1). In this manner, process 800 can enable the master device to be set into streaming mode last after the slave devices of the chain. At step 808, the master device can issue an Event and calculate an Event Delay value for the master device. For example, the master can perform the function of step 808 in response to having its streaming bit set at step 806. The event can include, for example, actions such as streaming image data, reading data from the device, writing data to the device, or any other suitable procedure a device can be instructed to perform. For example, in some embodiments the particular event that is to be issued by the master can be determined by a host system. The master device can issue the event by outputting the event on a suitable output pin such as a TMS pin (e.g., TMS pin 106 of FIG. 1). The Event Delay value can enable all devices of the chain to perform the event simultaneously and can be calculated by the master device in any suitable manner. For example, based on its position in the chain, the master can determine a number of clock cycles at least required for the last device in the chain to receive and respond to the event. As will be described in step 812, the master device can delay responding to the event until this number of clock cycles has passed.

At step 810, the event can be propagated down the chain to each slave device. For example, the event can be received at a SADDR pin of each device (e.g., SADDR pin 109 of FIG. 1) and then outputted from a TMS pin of that same device (e.g., TMS pin 106 of FIG. 1). The next device in the chain can then receive the event at its TMS pin and similarly pass the event on to the proceeding device in the chain. Accordingly, each device in the chain may see this event signal at a different time, dependent upon its position in the daisy chain. Each slave device may thus calculate its own Event Delay value based on its position in the chain. For example, similar to the master device, each slave device can determine a remaining number of clock cycles required for last device in the chain to receive and respond to the event. In this case, a slave device nearer to the end of the chain may calculate a smaller Event Delay value than a device nearer to the front of the chain.

At Step 812, all devices in the chain (e.g., the master device and the slave devices) can respond to the event simultaneously (e.g., can begin streaming the image data simultaneously). For example, in order to respond to the event simultaneously, after receiving the event each device can delay responding until a period of time (e.g., a number of clock cycles) corresponding to that devices Event Delay value has passed.

In this manner, a multi-sync function such as process 800 can enable the devices of a chain to perform an event simultaneously. Based on whether the device is a slave device or a master device, the device may perform different functions during the multi-sync process. For example, in response to being placed in streaming mode, a master device may immediately issue the event on its TMS pin and calculate the master device's Event Delay value. A slave device, on the other hand, in response to being placed in streaming mode may delay any further action until an event is received on its SADDR pin. In response to receiving such an event, the slave device can propagate the event to the next device in the chain (e.g., by outputting the event on its TMS pin) and calculate its own Event Delay value.

As mentioned above, the master device can be responsible for propagating the event down the chain of devices. Accordingly, as a host system does not need to control the propagating of the event, this system can provide a user-friendly and simple option for an end user of the system. For example, an end-user may only need to configure the host system to deliver the desired event to the master device. The master device can then control any necessary subsequent processes for propagating the event down the chain and/or synchronizing the devices' response to the event. In this manner, and end user may not need to perform special configurations to their host system, and rather can merely allow the master device to perform the bulk of the multi-sync function.

In some embodiments, the multi-sync system can include a parallel output data bus clock (referred to herein as "PIXCLK"). This PIXCLK may, for example, be used as the data capturing clock for any downstream device in the chain. In some embodiments, the PIXCLK can be generated internally within each SOC by using a PLL of each SOC. For example, each SOC can receive a system input clock (e.g., such as clock 406 of FIG. 4 that can be received at a CLKIN pin of each device), and the system input clock can be used as an input to each SOCs PLL to derive the PIXCLK signal. Thus, although all the SOCs can receive a common, system clock input to their PLL's, each device's PLL VCO can divide this system clock to generate their own PIXCLK signal. This may result in there being no fixed phase relationship between the system clock input to the device's PLL and the device's PIXCLK output. For example, in some embodiments there can be a variation of up to two PIXCLK clock cycles in the output timing between any two SOCs of the chain.

Alternatively, in some embodiments the PIXCLK signal can be derived directly from the system input clock. This may, for example, result in the PIXCLK signal output from each device being synchronized.

In some embodiments, a multi-sync mechanism can require all devices in the daisy-chain to be operated synchronously on the same input clock. For example, this constraint can imposed in order to allow the event to be propagated synchronously from the master through to each slave. Once such a clock constraint has been met, there may be at least two different scenarios for operating the chain. For example, the first scenario can correspond to where the devices are required to operate in "exact synchronization" (e.g., such that a PIXCLK, FRAME_VALID, and LINE_VALID out of one SOC is valid for all SOCs in the daisy-chain). In this case, the internal PLL of each SOC can be bypassed and the PIXCLK signal of each device can be derived directly from the system input clock. Accordingly, in the first scenario, the SOCs of the chain may need to configured to have parallel output data.

The second scenario can correspond to where the SOC devices are operated in "near synchronization" (e.g., within 4 clock cycles, 5 clock cycles). In this case, the internal PLL can be used to divide the PIXCLK signal from the system input clock, and the SOCs can use either parallel or serial output data. In this case, the misalignment between the outputs of different SOCs in the daisy-chain can arise because there is no phase-alignment between the internal clocks (e.g., PLL-derived internal clock) of the different devices in the daisy-chain. The actual misalignment between any pair of SOC devices can vary each time the SOC devices enter streaming mode. Generally, once in streaming mode, however, any such misalignment can remain fixed.

As mentioned above, the multi-sync function can use a SADDR (e.g., SADDR pin 109 of FIG. 1) as an input and a TMS pin (e.g., TMS pin 106 of FIG. 1) as an output. In some embodiments, the input can be sampled on a rising CLK signal and the output changes on a rising CLK signal. For example, such a CLK signal can include the input clock signal provided to the device, such as a clock signal provided to the CLKIN pin 108 of FIG. 1.

Figure 9:
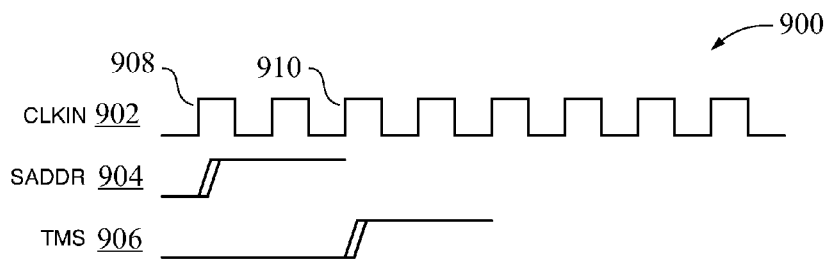
FIG. 9 shows illustrative timing diagram 900 that can illustrate the chain latency through a device in accordance with some embodiments of the invention.

When a TMS pin is enabled as an output, its default value (e.g., with the multi-sync function disabled) can be logic 0. Moreover, in some embodiments the chain_control register (e.g., Table 1) may only be written to when the device is not in streaming mode. In other words, the effect of writing to the chain_control register when the device is in streaming mode can result in an UNDEFINED status. When chain_enable=1 and master=0 (e.g., when the device is a slave device in an enabled chain), events and other signals received on the SADDR input pin can be propagated synchronously to that device's TMS output pin. In some embodiments, propagating an event and/or signal through the device in this manner can introduce a latency of 2 clock cycles. For example, FIG. 9 shows timing diagram 900 that can illustrate such a daisy chain latency. Timing diagram 900 can include the signals CLKIN 902, SADDR 904, and TMS 906. As illustrated by timing diagram 900, a signal can be received on SADDR 904 on risking clock edge 908 of CLKIN 902. This received signal can then be output at TMS 906 on rising clock edge 910 of CLKIN 902, where rising clock edge 910 can be 2 clock cycles after rising clock edge 908. Alternatively, any other suitable latency can be introduced by propagating a signal from a SADDR pin to a TMS pin of a device.

Figure 10:
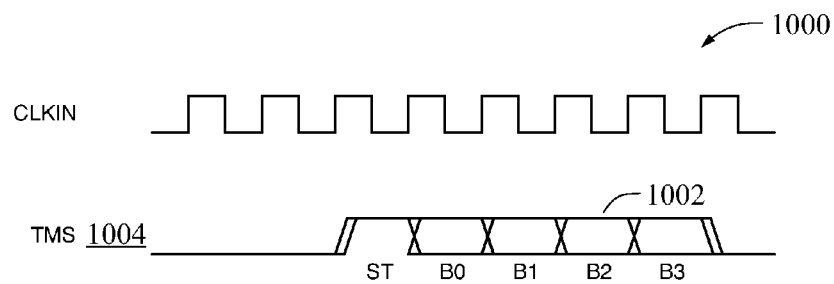
FIGS. 10 and 11 show timing diagrams 1000 and 1100 that can illustrate events codes in accordance with some embodiments of the invention.

As mentioned above, in some embodiments an event can be generated and issued on a TMS pin. As one illustration, when chain_enable=1 and master=1, then this master device can generate an event in response to having its streaming bit set. The event may then be propagated down a chain of devices by receiving that event at a device's SADDR pin and then passing the event on to the next device through the TMS pin. In some embodiments, the "event" that is propagated can be a signal including a "start bit" followed by a 4-bit code. For example, FIG. 10 shows timing diagram 1000 of an illustrative event code 1002 that can be output on TMS 1004. As shown by FIG. 10, event code 1002 can include a start bit ("ST") that can be followed by the 4 bits ("B0", "B1", "B2", and "B3") of the 4-bit code. The value of the 4-bit code can determine which event the chain is instructed to perform. As an example, a 4-bit code of 15 (e.g., "1111" or "0xf") can correspond to the event of streaming image data. Similarly, other event codes can be assigned to events such as reading data, writing data, or any other suitable event. Moreover, although a 4-bit code and a start bit are illustrated by FIG. 10, this is for the purpose of illustration and not for limitation. Rather, it should be understand that any other suitable signal and/or number of bits can be used to define events.

Figure 11:
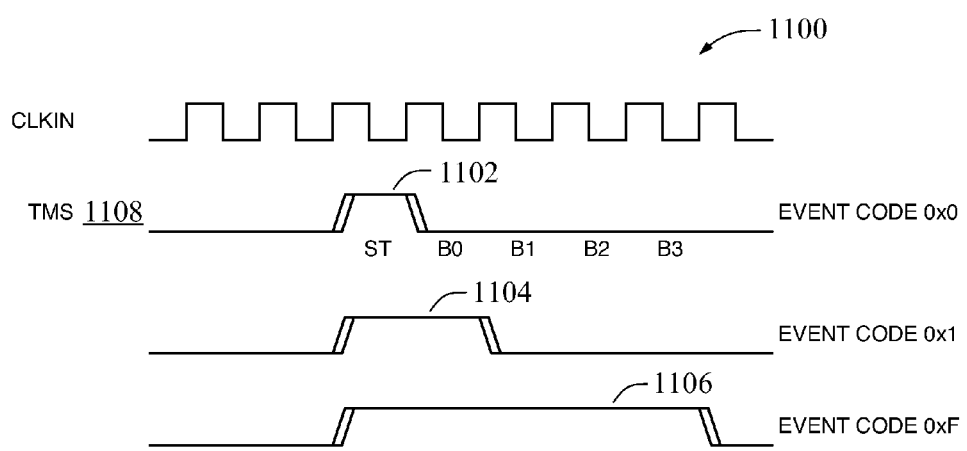

In some embodiments, a system can generate events with at least two event codes. For example, the master device of such a system can generate an event code with a 4-bit code of 0 (e.g., "0000" or 0x0") on an assertion of FRAME_VALID from the sensor core (e.g., sensor core 902 of FIG. 9). As another example, the master device of such a system can generate an event code with a 4-bit code of 15 (e.g., "1111" or 0xf") when the sensor core enters streaming mode. Alternatively, any other suitable event codes for various events could be generated. For example, FIG. 11 shows timing diagram 1100 of illustrative event codes such as event code 1102, event code 1104, and event code 1106 that could be output on TMS 1108.

As mentioned above, in some embodiments when chain_enable=1, sync_enable=1, and master=0 (e.g., when the device is a slave device in an enabled chain where the multi-sync function is enabled), and the sensor core of that device is set into streaming mode (e.g., bit 2 in a reset_register is changed to 1), the actual performance of streaming image data can be delayed until after the SOC receives a suitable event (e.g., an event instructing the device to stream image data). In particular, as described above, once the SOC is put in streaming mode and receives such an event, the SOC can delay responding to the event until an amount of time corresponding to the device's calculated Event Delay value has passed. As an illustration, when the event is to begin streaming image data, the device can respond to the event by asserting FRAME_VALID.

The delay a device asserts in beginning to stream data can be described as a delay relative to the transmission of the event from that device (e.g., where "transmission" of the event can occur when the event is output from a TMS pin or other suitable output pin of the device). The Event Delay value can measure the delay from transmission of the event to the device asserting FRAME_VALID for the first time. This Event Delay value can be a function of various sensor core register settings including, for example, integration time. A second delay value can measure the delay from the device first asserting FRAME_VALID to the associated streamed image data appearing on the device's I/O pins. This second delay value can be a function of various device settings including, for example, output format.

In some embodiments, multiple devices operating in synchronization should include the same integration time and the same operating mode at the time that the sensor is put into streaming mode. In some embodiments, the integration time can vary after the sensor is put into streaming mode.

The Event Delay value from transmission of the event from a device to that device asserting FRAME_VALID for the first time can be defined by:

$$\text{Event Delay} = x + 2 * p \quad (2)$$

clock cycles, where p can be the value of the position field (e.g., stored in the device's chain_control register) and x can be a delay constant for a given system configuration. Accordingly, a value of p can be selected by the device to offset the delay constant. In this manner, the position of the SOC in the daisy-chain can be used to calculate a unique delay for each device of the chain. For example, p can be equal to zero for the SOC that is at the end of the daisy chain (e.g., device 440 of FIG. 4) and can increase by 1 for each SOC up to and including the master (e.g., device 410 of FIG. 4).

In some embodiments, the transmission and receiving of an event can be separate occurrences (e.g., where "transmission" of the event can occur when the event is output from a TMS pin or other suitable transmission node of the device, and where "receiving" of the event can occur when the event is received at a SADDR pin or other suitable receiving node of the device). For example, in the master device, the event can first be transmitted from a transmission node. This transmitted signal can then be locally looped within the device to the device's receiving node, thus resulting in the device "receiving" the event at that moment. In this case, the receiving node of the master device can be the first node in the chain of devices to receive the event. Alternatively or additionally, in some embodiments the chain can be set up in a "ring" configuration, where the last device of the chain is coupled to the master device. In this case, rather than locally looping the transmitted signal, the master device can receive the event from the last device of the chain on its receiving node. Accordingly, in this scenario, the receiving node of the master device can be the last node of the chain to receive the event (e.g., as the event must first travel through the entire chain before returning to the receiving node of the master device).

However, in some embodiments, a ring configuration may not allow for the operation of automatically determining how many devices are present and/or which device is a master device unless a pull down can be included on a node adjacent the master device's SADDR pin. For example, in a normal chain configuration, the master device can be identified since its SADDR pin may be pulled to logic low, whereas the SADDR pins of the slave devices may be pulled to a logic high (e.g., where the SADDR pins may be pulled high by a logic high being output on a TMS pin of the previous device in the chain). In a ring configuration, however, the SADDR pins of both the master and slave devices may be pulled high by the previous device's TMS pin. Accordingly, to determine which device is the master device in a ring configuration, a pull-down can be included at the master device's SADDR pin to fight the previous device's pull-up, thereby driving the master device's SADDR pin to logic low. In some embodiments, the system can include a "control bit" to indicate whether the devices are configured in a chain or in a ring. As another example, a ring configuration may allow information exchange between all nodes.

In some embodiments, rather than setting all devices' addresses to the same value (e.g., setting all devices to address ID0 or to address ID1), a digital low-pass filter of the device's SADDR pin can be included. For example, as illustrated in FIG. 3, a low pass filter such as low pass filter 316 can be included. Since SADDR 309 to the serial interface 304 can be effectively static, low-pass filter 316 can remove high-frequency transitions on SADDR 309 associated with the unidirectional control link.

It should be understood that the processes described above are merely illustrative. Any of the steps may be removed, modified, or combined, and any additional steps may be added, without departing from the scope of the invention.

It will be apparent to those of ordinary skill in the art that methods involved in the invention may be embodied in a computer program product that includes a machine readable and/or usable medium. For example, such a computer usable medium may consist of a read-only memory device, such as a CD ROM disk or conventional ROM device, or a random access memory, such as a hard drive device or a computer diskette, or flash memory device having a computer readable program code stored thereon.

The described embodiments of the invention are presented for the purpose of illustration and not of limitation.

What is claimed is:

1. A method for assigning a unique address to each device of a plurality of devices configured in a chain, the method comprising:

transmitting a first command including an address ID of a first default address, wherein the first command comprises instructions to assign a first unique address, and wherein only a first device of the chain is initially assigned the first default address and each of the remaining devices of the chain is initially assigned a second default address, such that only the first device of the chain responds to the first command;

transmitting a second command including the first unique address, wherein the second command comprises instructions to invert a logic level on an output pin, and wherein only the first device responds to the second command;

receiving the logic level from the output pin of the first device on an input pin of a second device, wherein inversion of the logic level causes the second device to change behavior from ignoring the first default address to responding to the first default address; and transmitting a third command including the first default address, wherein the third command comprises instructions to assign a second unique address, and wherein only the second device of the chain is assigned the first default address, the first device of the chain is assigned the first unique address, and each of the other devices of the chain is assigned the second default address, such that only the second device of the chain responds to the third command.

2. The method of claim 1, wherein the instructions to invert a logic level comprise:

instructions to output a logic low signal on the output pin.

3. The method of claim 1, wherein receiving comprises:
changing an address ID of the second device from the second default address to the first default address in response to the receiving.

4. The method of claim 1, wherein the input pin of the second device comprises an address select pin.

5. The method of claim 1, wherein:
the first device is hardwired such that the first device is initially assigned the first default address; and
the first device responds to the first command in response to its hardwired, first default address matching the address ID included in the first command.

6. The method of claim 1, wherein the first device responding to the first command comprises:
writing to an address_register of the first device to change an address associated with the first device to the first unique address.

7. The method of claim 1, wherein transmitting the first command, transmitting the second command, and transmitting the third command is performed by a host system external to the plurality of devices.

8. The method of claim 1, wherein:
the plurality of devices are all sequentially configured by repeating the two steps of:
transmitting a first command; and
transmitting a second command;
each time the two steps are repeated a new unique ID is used in the two steps; and
the two steps are repeated until each device in the plurality of devices has been configured by the two steps.

9. The method of claim 1, wherein the first command and the second command comprise a single command that is transmitted at the same time.

10. The method of claim 1, wherein the first, second, and third commands are transmitted to the plurality of devices using an inter-integrated circuit (I2C) bus configuration.

11. The method of claim 1, wherein the plurality of devices are further configured in an inter-integrated circuit (I2C) bus configuration.

12. The method of claim 1, wherein the output pin instructed to output the logic low signal by the second command comprises a Test Mode Select pin of the first device.

13. The method of claim 1, wherein the second command further includes instructions to:
enable a master device position;
enable a chain configuration; and
enable a multi-sync function.

14. The method of claim 1, wherein:
in response to the first device responding to the second command, an address ID of the first device is not affected by a logic level received at an address select pin of the first device, such that the address ID of the first device subsequently remains as the first unique address.

15. A method for sequentially configuring each device in a daisy-chain of devices, wherein each device is electrically coupled to the other devices in the daisy-chain, the method comprising:
transmitting, from a host system external to the daisy-chain, a first command that is addressed to a first default address, wherein the first command comprises instructions to assign a new, unique address to a single, particular device, wherein the particular device is initially assigned the first default address and each of the remaining devices of the chain is initially assigned a second default address, such that only the particular device responds to the first default address;
transmitting, from the host system, a second command that is addressed to the new, unique address, wherein the particular device is assigned the new, unique address and now responds to the new, unique address and wherein the second command comprises instructions to:
define a position of the particular device in the daisy-chain;
configure a particular pin of the particular device as an output pin, wherein the particular pin is electrically coupled to an address select pin of a next device in the daisy chain; and
invert a logic level of the particular pin; and
repeating the transmitting of the first command and the transmitting of the second command until each device in the second chain has been configured by the first and second command, and wherein a different, unique address is used each time the transmitting is repeated.

16. The method of claim 15, wherein:
the host system is coupled to each device in the daisy chain through a two-wire control bus; and
the transmitting comprises transmitting on a serial data line of the two-wire control bus.

17. The method of claim 15, wherein defining position comprises:
defining a number of the devices in the daisy-chain prior to transmitting the first and second commands; and
decrementing the number each time the transmitting of the first command and the second command is repeated to define the position.

18. The method of claim 15, wherein defining the position comprises:
automatically determining a number of the devices in the daisy-chain as the transmitting of the first command and the second command is repeated.

* * * * *